Oct. 26, 1926.
W. TIMSON
1,604,325
PENDULOUS AUTOMATIC WEIGHING SCALE
Filed March 3, 1923   2 Sheets-Sheet 1
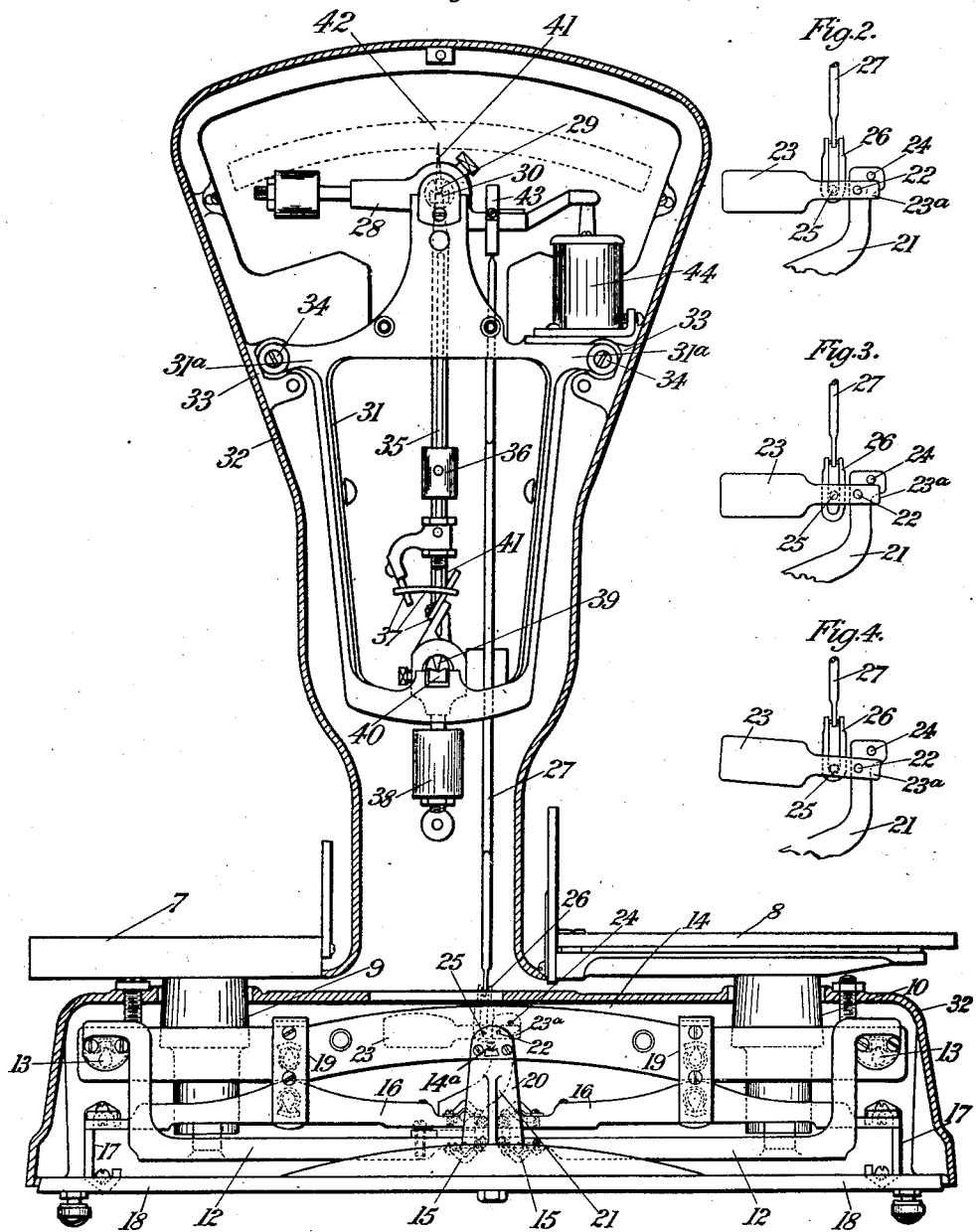
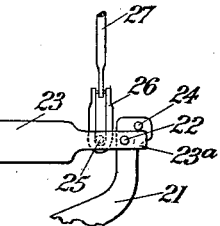
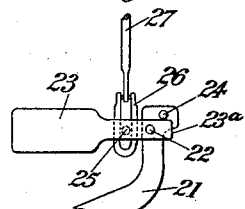
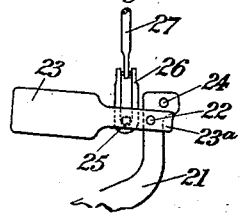
INVENTOR:
WILLIAM TIMSON.
BY George E. Folkes.
ATTORNEY.

Oct. 26, 1926.

W. TIMSON 1,604,325

PENDULOUS AUTOMATIC WEIGHING SCALE

Filed March 3, 1923   2 Sheets-Sheet 2

INVENTOR:
WILLIAM TIMSON
By George E. Folkes
ATTORNEY.

Patented Oct. 26, 1926.

1,604,325

UNITED STATES PATENT OFFICE.

WILLIAM TIMSON, OF BIRMINGHAM, ENGLAND, ASSIGNOR TO W. & T. AVERY, LIMITED, OF BIRMINGHAM, ENGLAND.

PENDULOUS AUTOMATIC WEIGHING SCALE.

Application filed March 3, 1923, Serial No. 622,649, and in Great Britain September 8, 1922.

This invention has reference to improvements in pendulous automatic weighing scales.

The present invention is particularly applicable to a pendulous counter scale of known type, and has for its object certain improvements in the construction and operation of certain parts of the scale mechanism as will be hereinafter defined.

The invention consists in improvements in pendulous automatic weighing scales, and is characterized first by the employment of a lever weight and link mechanism which prevents any shock due to violent application or removal of the load to or from the scale mechanism being transmitted to the indicator mechanism; secondly to the improved lever construction whereon the scale plates are mounted; and thirdly to the means for removably supporting the pendulous indicating mechanism of the scale within the housing.

The construction and operation of a scale according to the present invention will now be described with reference to the accompanying drawings, wherein similar reference numerals indicate similar parts in the several views.

Fig. 1 is a part sectional front elevation of the scale mechanism.

Fig. 2 is a detail view separately of the lever weight and link mechanism forming part of the present invention shown in the position seen in Fig. 1.

Figs. 3 and 4 illustrate alternative positions of this mechanism.

Figure 5:
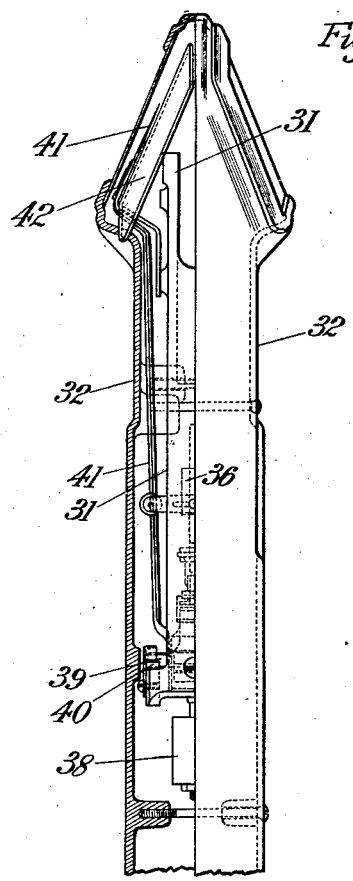
Fig. 5 is a half sectional end elevation of the upper part of the scale housing and mechanism seen in Fig. 1.
Figure 6:
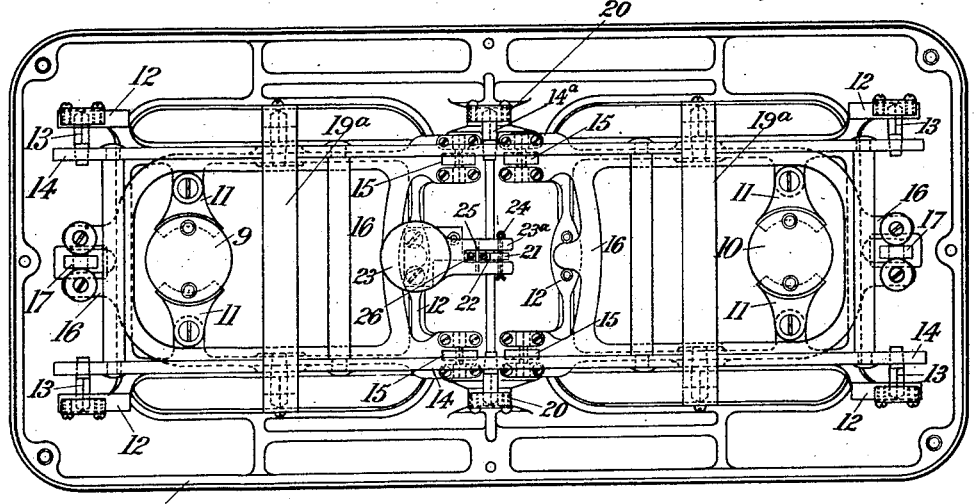
Fig. 6 is a plan of the lever mechanism for supporting the scale plates, this lever mechanism being mounted on a base plate, the lower part of the scale housing being removed.

Referring now generally to the drawings for the purpose of explaining briefly the scale mechanism as a whole, 7 is a weight plate and 8 a goods plate supported by means of cylindrical stems 9 and 10 respectively upon inwardly projecting cross pieces 11 forming part of a pair of levers 12 which are respectively fulcrumed on the knife-edges 13 of the even armed lever 14 the levers 12 being suspended at their inner ends by means of links 15 from the inner ends of a pair of levers 16 fulcrumed by means of knife-edges at their outer ends in the link bearings 17 anchored to the base plate 18 of the scale housing. These levers 16 are connected substantially midway in their length by means of knife-edges and bearing links 19, each pair of links 19 being connected together by a stretcher bar 19ª; these links 19 connect the levers 16 to the knife-edges laterally projecting from the even-armed lever 14 on either side of the centre thereof, so that a complete balanced system of lever support for the scale plates is obtained. The even armed lever 14 is fulcrumed by means of the knife-edge 14ª upon bearings 20 mounted on the base of the scale housing. The five levers 12, 12, 14, 16 and 16 are all mounted upon the base plate 18 supporting the lower part of the scale housing 32.

The left hand lever 12 has secured thereto a bracket 21 on which is pivotally mounted by means of a pin 22 a lever weight 23 formed with an integral arm 23ª. The bracket 21 is also provided with a stop pin 24 which projects therefrom and with which the upper face of the arm 23ª is normally adapted to contact. This arm of the lever weight is provided with a projecting pin 25 which is located within the link 26 which in turn is suspended from the lower end of the connecting rod 27 which is suspended from the lever 28. The purpose of this lever weight and its method of connection will be hereinafter explained.

The upper section of the scale mechanism consists of a lever 28 fulcrumed by means of a knife-edge 29 on the bearing 30 which is mounted upon the frame bracket 31. This bracket is mounted in the upper part of the scale housing 32 by means of the two projecting lugs 33 which are adapted to receive the outwardly projecting arms 31ª of the frame bracket 31, the frame bracket being secured to the said lugs 33 by means of screws 34. This frame bracket 31 carries the whole of the upper part of the scale mechanism in such a manner that it can be readily assembled or removed from the upper part of the scale housing as a unit for renewal or repair or other purposes, thereby greatly facilitating the work of erecting or dismantling the scale mechanism. Connected to the lever 28 is a downwardly projecting arm 35 on which is mounted a pendulous weight 36, this arm 35 being connected in known manner by means of the knife-edge plates and stays 37 to the arm of the pendulous weight 38 mounted by means of the knife-edge 39 on the bearing 40 in the frame bracket 31. Connected to the said arm of the pendulous weight 38 is a weight indicating pointer 41 the upper end of which is adapted to indicate against a chart 42 in the upper part of the scale housing and visible through apertures therein. This indicating pointer 41 is of duplex construction so that the weight can be seen at either side of the scale housing as will be understood from Fig. 5 of the drawings. The connecting rod 23 is suspended at its upper end by means of the link bearing 43 from one arm of the lever 28 and this arm of the lever is also pivotally connected to the piston of a dashpot 44 which is employed in the ordinary manner to prevent excessive vibration of the pendulous lever 28. It should be made clear that the indicating mechanism which has been described and shown is per se not novel; the novelty residing in the mounting of the whole of this mechanism upon the frame bracket 31 with the object hereinbefore mentioned.

When the scale is in operation an automatic indication of the load within the limits of the chart 42 is obtained by the position of the pointer 41 which is governed by the pendulous weights 36 and 38. When the load exceeds the limit of the said pendulous weights and therefor of the chart, an ordinary dead weight is placed on the weight plate 7 which maintains the pointer 41 in the zero position and any excess of weight beyond that of the dead weight on the plate 7 is automatically indicated by the pointer 41 within the limits of the pendulous weights 36 and 38 and the chart 42 according to a well known type of scale construction. When goods are placed upon the plate 8 the right hand section of the lever 14 is depressed and thereby raises the left hand lever 12 and the bracket 21 attached thereto, in so doing the bracket 21 raises the lever weight 23 to the position seen in Fig. 3 removing the pin 25 from contact with the bottom of the link 26. Contact is slowly re-established by the upward movement of the connecting rod 27 and the link 26 under the action of the pendulous weights 36 and 38 acting through the lever 28 at a speed determined by the dashpot 44. When contact is re-established the position occupied is again that seen in Fig. 2. Assuming now the load is suddenly removed from the scale plate 8 the weights plate 7, the levers 12 and the bracket 21 fall as one member and the pin 25 of the lever weight 23 is held in its uppermost position by its engagement with the bottom of the link 26, thereby causing the lever weight 23 to turn about its pivot pin 22 on the bracket 21 and to assume the position seen in Fig. 4. This lever weight subsequently assumes its normal position as seen in Fig. 2 by the permissive action of the pendulums 36 and 38 acting through the lever 28 and dashpot 44 in the opposite direction to that which obtains when the load is applied to scale plate 8. By this means any violent application or removal of load to or from the scale plates is not transmitted to the indicating mechanism of the scale. The only weight which is immediately transmitted to the indicating mechanism is that of the lever weight 23.

What I claim is:

1. In pendulous weighing scales of the kind herein referred to, two scale plates, an even armed lever, levers connected to the said scale plates and supported from the even armed lever, a pair of levers linked to said first mentioned levers and to the even-armed lever, a bracket, a weighted lever pivotally mounted in said bracket, means connecting the said weighted lever and one of the second mentioned pair of levers, an indicating mechanism and a connecting rod linked to said lever and communicating the movement of the several levers to the indicating mechanism.

2. In pendulous weighing scales of the kind herein referred to, two scale plates, a plurality of levers (12, 14 and 16) supporting said scale plates, a bracket connected to one of the said levers, a weighted lever fulcrumed on said bracket having its operations controlled thereby, a weight indicating mechanism, a connecting rod connecting the said weighted lever to the indicating mechanism, and a frame bracket for supporting the whole of the said indicating mechanism as a removable unit from the scale housing.

In testimony whereof, I have signed my name to this specification.

WILLIAM TIMSON.